June 30, 1942.    C. W. SINCLAIR    2,288,146
BRAKE
Filed June 28, 1940    3 Sheets-Sheet 1
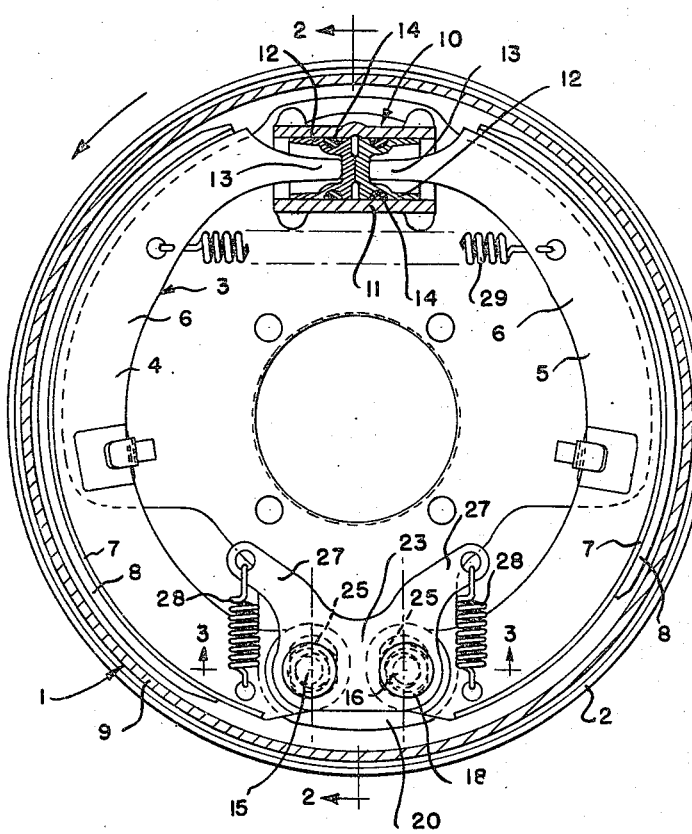
FIG.1.
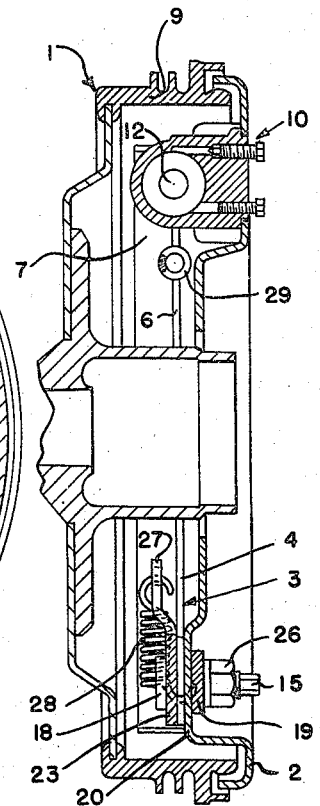
FIG.2.
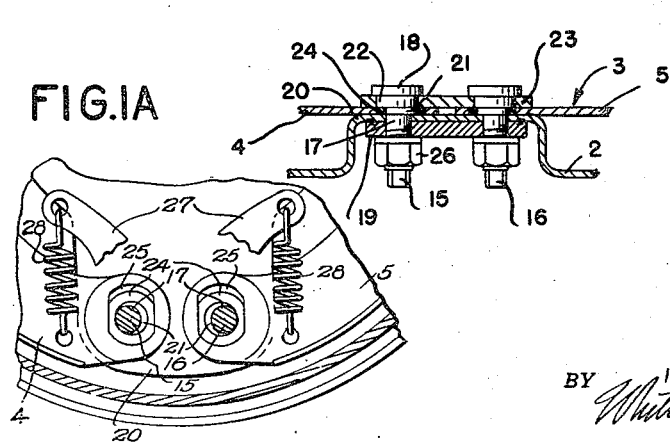
FIG.1A
FIG.3.
INVENTOR.
CHARLES W. SINCLAIR
BY *Whittemore Hulbert & Belknap*,
ATTORNEYS June 30, 1942.  C. W. SINCLAIR  2,288,146
BRAKE
Filed June 28, 1940  3 Sheets-Sheet 2

INVENTOR.
CHARLES W. SINCLAIR
BY
ATTORNEYS

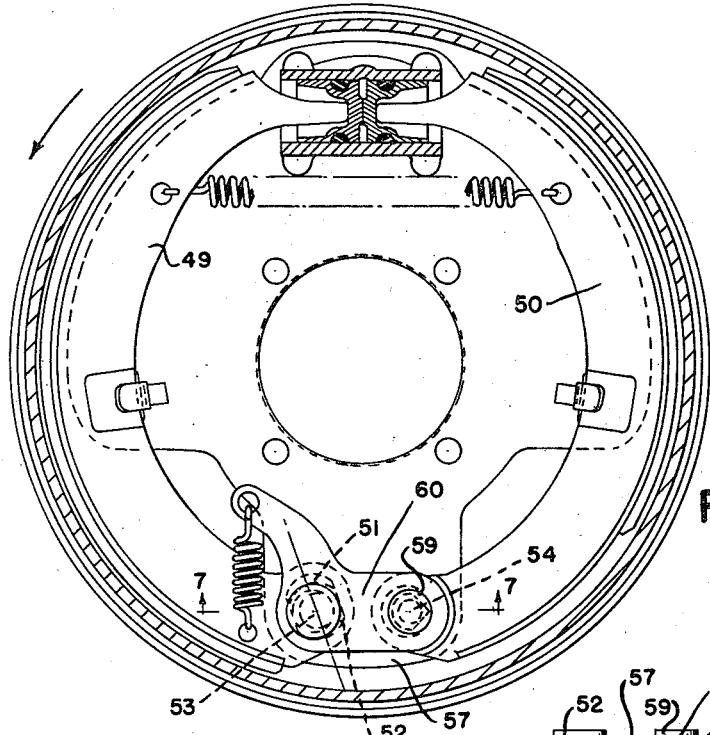
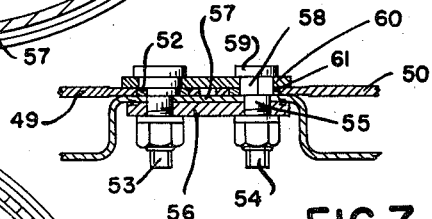
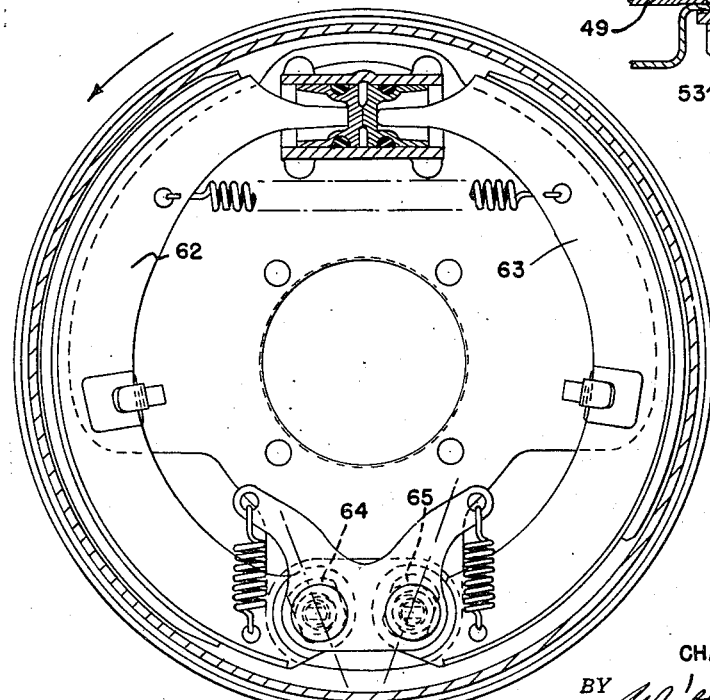

Patented June 30, 1942

2,288,146

UNITED STATES PATENT OFFICE 2,288,146

BRAKE

Charles W. Sinclair, Detroit, Mich., assignor to Kelsey-Hayes Wheel Company, Detroit, Mich., a corporation of Delaware Application June 28, 1940, Serial No. 343,042

2 Claims. (Cl. 188—78)

The invention relates to brakes and refers more particularly to brakes for use with motor vehicle wheels.

The invention has for one object to provide a simple construction of brake having increased braking efficiency at least in one direction of travel of the motor vehicle. The invention has for another object to provide a simple spring arrangement for retracting the brake friction device.

These and other objects of the invention will become apparent from the following description, taken in connection with the accompanying drawings, in which Figure 1 is a sectional elevation of a brake illustrating an embodiment of my invention;

Figure 1A is a view similar to Figure 1 showing a portion thereof with parts broken away and in section;

Figures 2 and 3 are cross sections on the lines 2—2 and 3—3, respectively, of Figure 1;

Figures 4, 5 and 6 are views similar to Figure 1 showing other embodiments of my invention;

Figure 7 is a cross section on the line 7—7 of Figure 6;

Figure 8 is a view similar to Figure 1 showing another embodiment of my invention.

Figure 4:
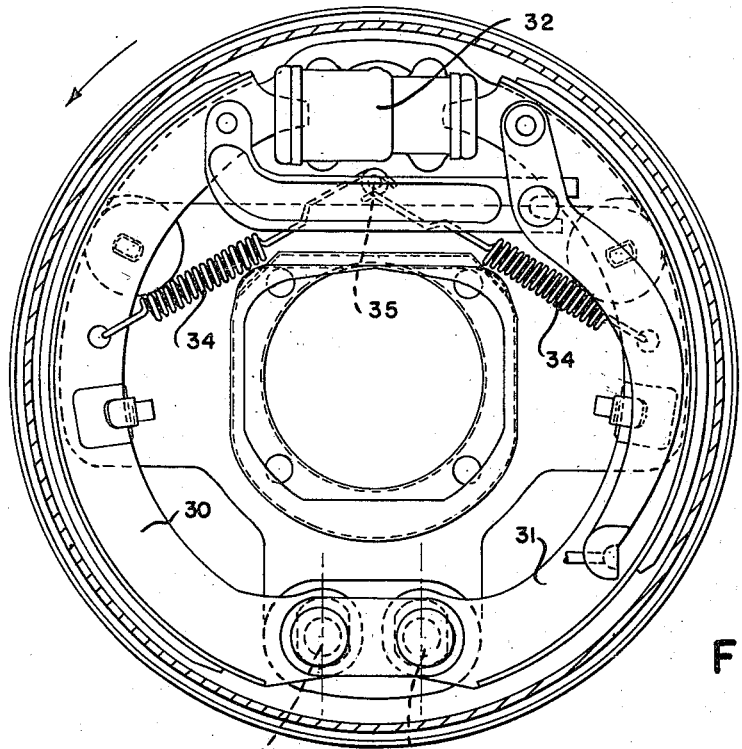

Referring to the brake illustrated in Figures 1, 1A, 2 and 3, I is the brake drum, 2 the backing plate, and 3 the brake friction device comprising the brake shoes 4 and 5. Each brake shoe is of T-section and has the radial web 6 and the arcuate axial flange 7 to which is secured the lining 8 engageable with the annular braking flange 9 of the brake drum. For actuating the brake friction device, I have provided the wheel cylinder 10, in the present instance, located between the upper ends of the shoes. This wheel cylinder comprises the cylinder 11 secured to the backing plate 2 and the pistons 12 within the cylinder and engaging the reduced extensions 13 at the upper ends of the webs 6 of the shoes. Suitable sealing rings 14 are provided between the pistons and cylinder and the cylinder is also provided with the usual passage for the brake liquid and also the usual bleed passage.

The other or lower ends of the shoes are mounted upon the anchor pins 15 and 16. These anchor pins are alike and each is formed with the shank 17 and the head 18. The shank extends through the outside tie plate 19 and the depressed portion 20 of the backing plate, the two plates being fixedly secured to each other preferably by being welded together. The shank has the eccentric portion 21 immediately inside the depressed portion 20 and the adjacent enlarged portion 22, the latter being concentric with the shank. 23 is an inside tie plate having a pair of holes in each of which the enlarged portion 22 of an anchor pin is located. Each of the heads 18 abuts the inside tie plate. 24 is a washer journaled upon the eccentric portion 21 of each anchor pin and having diametrically opposite flat edges which are slidably engageable with diametrically opposite flat edges of the elongated opening 25 formed in the lower end of the web 6 of the associated shoe. The outer end of the shank of each anchor pin is polygonal-shaped for engagement by a suitable wrench to effect rotative adjustment of the anchor pin. The shank is also externally threaded to receive the clamping nut 26 which serves to secure the anchor pin in its position of rotative adjustment.

As illustrated in the present instance, the axes of the anchor pins are substantially equally spaced from the diametral line of the brake drum passing through the middle of the wheel cylinder 10 and the elongated openings 25 formed in the lower ends of the webs of the shoes have their major axes parallel to this line when the shoes are in retracted position with the lower ends of the openings abutting the washers on the anchor pins. As a result, it will be seen that upon actuation of the wheel cylinder 10 the upper ends of the shoes are spread apart and forced against the braking flange 9 of the brake drum. With the brake drum rotating in the direction of the arrow indicated in Figure 1, the shoe 4 is the leading shoe and it wraps into engagement with the brake drum and moves peripherally therewith toward the anchor pin 15 and in so doing its lower end is compelled to move outwardly against the braking flange, thereby increasing the effectiveness of the brake. With the brake drum rotating in the reverse direction it will be seen that this operation takes place with the shoe 5. The arrangement also provides for the following of the braking flange by the shoes when the brake is applied to take care of out of round condition of the brake drum and unequal wear of the brake lining.

For the purpose of retracting the shoes, the inside tie plate 23 is provided with the diverging arms 27, the end portions of which are axially offset from the body portion of the plate to provide clearance for the coil springs 28. As illustrated, there is one coil spring connected at its upper end to the end of each arm and connected at its lower end to the web of the shoe adjacent the anchor to resiliently urge the lower end of the elongated opening in the shoe against the anchor, the arrangement being such that in the retracting positions of the shoes the axes of the coil springs are substantially parallel to the major axes of the elongated openings in the lower ends of the shoe webs. There is also the coil spring 29 extending between the upper end portions of the shoes radially inside the wheel cylinder to resiliently urge the upper end portions toward each other to positions determined by suitable stops.

In the modification illustrated in Figure 4, the brake friction device comprises the leading and trailing brake shoes 30 and 31, respectively, having their upper ends adapted to be spread apart by the wheel cylinder 32 and their lower ends mounted upon the anchor pins 33, the construction being substantially the same as that illustrated in Figures 1, 2 and 3. However, instead of providing retracting coil springs between the inside tie plate and the lower ends of the shoes and another coil spring between the upper ends of the shoes, I provide but one coil spring 34 for retracting each shoe. This coil spring is connected at its lower end to the web of the shoe near, but preferably slightly above, its middle and at its upper end to the stud 35 which is secured to the backing plate and extends transversely therefrom midway of the wheel cylinder and radially inwardly thereof. By reason of the inclination of these coil springs, it will be noted that they serve to retract both ends of the shoes from the braking flange of the brake drum to positions determined by the anchor pins and suitable stops adjustably mounted on the backing plate.

Figure 5:
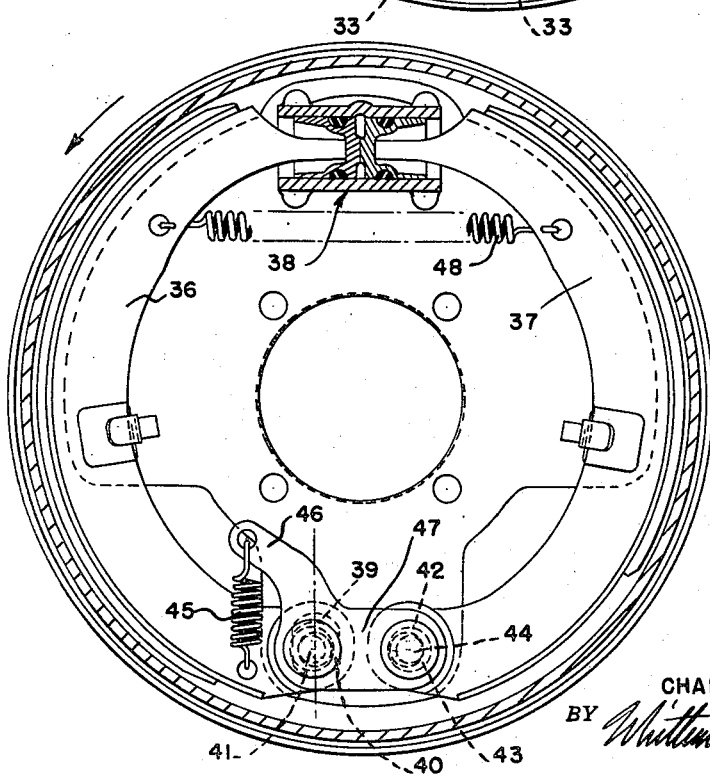

Figure 5 illustrates another embodiment of my invention which is very similar to the embodiment illustrated in Figures 1, 2 and 3. As shown, 36 and 37 are leading and trailing shoes, respectively, with the brake drum rotating in the direction indicated by the arrow. 38 is the wheel cylinder, similar to the wheel cylinder 10, for actuating the shoes by spreading their upper ends apart and against the braking flange of the brake drum. The leading shoe 36 is formed in the same manner as the shoe 4 of Figures 1, 2 and 3 and has at its lower end the elongated opening 39, the major axis of which is parallel to the diametral line through the brake drum and the middle of the wheel cylinder. 40 is the washer within the elongated opening for compelling the lower end of the leading shoe to move against the braking flange upon peripheral movement of the leading shoe with the brake drum toward the washer. The washer is mounted upon the anchor pin 41 which is constructed in the same manner as the anchor pin 15. The lower end of the trailing shoe 37 is formed with the circular opening 42 to receive the washer 43 upon the anchor pin 44. The washer 43 is circular and the anchor pin 44 is constructed in the same manner as the anchor pin 16 of Figures 1, 2 and 3. Thus, in this case, the end opposite the actuator of but one shoe is compelled to move against the braking flange of the brake drum. For retracting the leading and trailing brake shoes, I provide the coil spring 45 between the arm 46 upon the inside tie plate 47 and the lower end of the web of the leading shoe adjacent its elongated opening and the coil spring 48 extending between the upper ends of both shoes radially inwardly of the wheel cylinder.

Figures 6 and 7 disclose another modification which is generally similar to that illustrated in Figure 5, the essential difference being at the anchor or lower ends of the leading and trailing brake shoes 49 and 50, respectively. The lower end of the web of the leading shoe 49 is provided with the elongated opening 51, the major axis of which is arranged at an angle to the diametral line through the brake drum and the middle of the wheel cylinder. This angle, as illustrated, may be from 20° to 30°. The washer 52 within the elongated opening and the anchor pin 53 upon which the washer is located are formed in the same manner as the washer 40 and the anchor pin 41 of Figure 5. The anchor pin 54 for the lower end of the trailing shoe 50 is formed in a slightly different manner. In detail, this anchor pin has the shank 55 which extends through the outside tie plate 56 and the depressed portion 57 of the backing plate and is formed with the enlarged portion 58 adjacent the head 59 of the anchor pin. The enlarged portion 58 has a substantially half-round part and a substantially triangular part, the latter having converging flat sides extending from the ends of the half-round part. The opening in the inside tie plate 60 for receiving the enlarged portion 58 is circular having the same radius as the half-round part. The washer 61 upon which the lower end of the trailing shoe 50 is journaled has an eccentric opening shaped to correspond with the enlarged portion 58 so that upon rotative adjustment of the anchor pin 54 the washer will also be rotated.

Figure 8 illustrates another embodiment of my invention in which the lower ends of the webs of the brake shoes 62 and 63 opposite the actuator are formed with the elongated openings 64 and 65, respectively, the major axes of both of which are inclined to the diametral line of the brake drum passing through the middle of the actuator, the preferred angles of inclination being from 20° to 30°. Aside from the inclination of the major axes of the openings, the anchor construction is exactly the same as that illustrated in Figures 1, 2 and 3. With this arrangement, it will be noted that the effectiveness of the brake is increased for both directions of rotation of the brake drum. In this connection, it is apparent that, if desired, the construction of anchor pins and washers thereon may be the same as that of the anchor pin 54 and washer 61 illustrated in Figure 7.

What I claim as my invention is:

1. In a brake, a brake drum, a brake friction device engageable with said drum comprising brake shoes having corresponding ends adapted to be spread apart against said brake drum, a backing plate, a second plate secured in fixed relation to said backing plate and having an arm, anchor pins for the other ends of said shoes extending through said plates, one of said anchor pins guiding the last mentioned end of one of said shoes against said drum upon peripheral movement of said last mentioned shoe with said drum toward said last mentioned anchor pin, and a retracting spring between said last mentioned shoe end and said arm.

2. In a brake, a brake drum, a brake friction device engageable with said drum comprising a brake shoe, a backing plate, a second plate secured in fixed relation to said backing plate and having a part spaced radially inwardly of said drum from said shoe, an anchor pin for said shoe extending through said plates for causing an end of said shoe to move against said drum upon peripheral movement of said shoe with said drum toward said anchor pin, and a retracting coil spring between said last mentioned shoe end and said second plate part for moving said last mentioned shoe end away from said drum.

CHARLES W. SINCLAIR.